US009872058B2

(12) United States Patent
Schneider et al.

(10) Patent No.: US 9,872,058 B2
(45) Date of Patent: Jan. 16, 2018

(54) SPLITTING CONTENT CHANNELS (71) Applicant: GOOGLE INC., Mountain View, CA (US)

(72) Inventors: Michael Patrick Schneider, Venice, CA (US); Justin Lewis, Marina del Rey, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 14/588,135

(22) Filed: Dec. 31, 2014

(65) Prior Publication Data
US 2015/0245083 A1 Aug. 27, 2015

Related U.S. Application Data (60) Provisional application No. 61/944,495, filed on Feb. 25, 2014, provisional application No. 61/944,493, filed on Feb. 25, 2014.

(51) Int. Cl.
*H04N 21/2668* (2011.01)
*H04N 21/643* (2011.01)
(Continued)

(52) U.S. Cl.
CPC ....... *H04N 21/2668* (2013.01); *H04N 21/252* (2013.01); *H04N 21/25866* (2013.01);
(Continued)

(58) Field of Classification Search
CPC ............. H04N 21/2668; H04N 21/222; H04N 21/2385; H04N 21/25841;
(Continued)

(56) References Cited

U.S. PATENT DOCUMENTS 8,370,874 B1 * 2/2013 Chang ................ H04N 21/4532
725/44
8,745,206 B1 * 6/2014 Chang .................... H04L 67/22
709/223
(Continued)

OTHER PUBLICATIONS

International Search Report and the Written Opinion of the International Searching Authority for International Patent Application No. PCT/US15/17574, dated Jun. 9, 2015, 8 pages.
(Continued)

*Primary Examiner* — Pankaj Kumar
*Assistant Examiner* — Alexander Boyd
(74) *Attorney, Agent, or Firm* — Lowenstein Sandler LLP (57) ABSTRACT A method for splitting content channels is disclosed. The method includes identifying, by a processing device of a content sharing platform, result channels originating from a target channel of the content sharing platform, wherein each of the result channels corresponds to a set of users of the target channel that view a similar set of content items from the target channel. The method may further include, for each of the result channels, subscribing, by the processing device to the result channel, the set of users that corresponds to the result channel, and associating, by the processing device to the result channel, the set of the content items of the target channel that corresponds to the subscribed set of users of the result channel.

25 Claims, 6 Drawing Sheets (51) Int. Cl.

| | | |
|---|---|---|
| *H04N 21/44* | (2011.01) | |
| *H04N 21/2743* | (2011.01) | |
| *H04N 21/4788* | (2011.01) | |
| *H04N 21/25* | (2011.01) | |
| *H04N 21/258* | (2011.01) | |
| *H04N 21/472* | (2011.01) | |
| *H04N 21/647* | (2011.01) | |
| *H04N 21/462* | (2011.01) | |
| *H04N 21/488* | (2011.01) | |
| *H04N 21/482* | (2011.01) | |

(52) U.S. Cl.
CPC ... *H04N 21/2743* (2013.01); *H04N 21/44016* (2013.01); *H04N 21/4788* (2013.01); *H04N 21/64322* (2013.01); *H04N 21/25841* (2013.01); *H04N 21/25883* (2013.01); *H04N 21/25891* (2013.01); *H04N 21/462* (2013.01); *H04N 21/472* (2013.01); *H04N 21/482* (2013.01); *H04N 21/4882* (2013.01); *H04N 21/64784* (2013.01)

(58) Field of Classification Search
CPC ....... H04N 21/25883; H04N 21/44016; H04N 21/462; H04N 21/472; H04N 21/4882; H04N 21/64322; H04N 21/64784; H04N 21/2743; H04N 21/25866; H04N 21/252; H04N 21/4788
See application file for complete search history.

(56) References Cited

U.S. PATENT DOCUMENTS

| | | | |
|---|---|---|---|
| 2003/0126600 A1 | 7/2003 | Heuvelman | |
| 2005/0132420 A1 | 5/2005 | Howard et al. | |
| 2011/0004831 A1* | 1/2011 | Steinberg | H04N 21/454 |
| | | | 715/753 |
| 2011/0145064 A1* | 6/2011 | Anderson | G06Q 30/02 |
| | | | 705/14.53 |
| 2011/0321072 A1* | 12/2011 | Patterson | H04N 21/44222 |
| | | | 725/5 |
| 2012/0054278 A1 | 3/2012 | Taleb | |
| 2012/0059795 A1* | 3/2012 | Hersh | G06F 7/78 |
| | | | 707/628 |
| 2012/0143700 A1 | 6/2012 | Bhattacharya et al. | |
| 2012/0185892 A1 | 7/2012 | Camplejohn et al. | |
| 2012/0227064 A1 | 9/2012 | Neill | |
| 2012/0277004 A1 | 11/2012 | Moinuddin et al. | |
| 2012/0284290 A1* | 11/2012 | Keebler | G06F 17/3089 |
| | | | 707/756 |
| 2012/0311649 A1 | 12/2012 | Patten et al. | |
| 2014/0095611 A1* | 4/2014 | Weinstein | H04L 67/22 |
| | | | 709/204 |
| 2014/0229293 A1* | 8/2014 | Huang | G06Q 30/0273 |
| | | | 705/14.69 |
| 2014/0020027 A1 | 12/2014 | Korst et al. | |
| 2015/0007235 A1* | 1/2015 | Lewis | H04N 21/4622 |
| | | | 725/56 |

OTHER PUBLICATIONS

International Search Report and the Written Opinion of the International Searching Authority for International Patent Application No. PCT/US2015/017577, dated Jun. 10, 2015, 7 pages.

USPTO, Office Action for U.S. Appl. No. 14/588,152, dated 02/11/216.

USPTO, Final Office Action for U.S. Appl. No. 14/588,152, dated Aug. 10, 2016.

USPTO, Office Action for U.S. Appl. No. 14/588,152, dated Oct. 19, 2016.

USPTO, Final Office Action for U.S. Appl. No. 14/588,152, dated Feb. 10, 2017.

EP Search Report for EP Application No. 15755574.9, dated Jun. 12, 2017 (11 pages).

EP Search Report for EP Application No. 15755332.2, dated Jun. 8, 2017 (11 pages).

* cited by examiner

```
┌─────────────────────────────────────────────────────────────────────┐
│ Receive notification from channel owner to proceed with splitting a │
│ target channel                                                      │
│                                                               410   │
└─────────────────────────────────────────────────────────────────────┘
                                   ↓
┌─────────────────────────────────────────────────────────────────────┐
│ Identify a set of result channels that the target channel is split  │
│ into                                                                │
│                                                               420   │
└─────────────────────────────────────────────────────────────────────┘
                                   ↓
┌─────────────────────────────────────────────────────────────────────┐
│ Identify content items from the target channel to syndicate to each │
│ of the result channels                                              │
│                                                               430   │
└─────────────────────────────────────────────────────────────────────┘
                                   ↓
┌─────────────────────────────────────────────────────────────────────┐
│ Identify set of subscribed users to add to each result channel      │
│                                                               440   │
└─────────────────────────────────────────────────────────────────────┘
                                   ↓
┌─────────────────────────────────────────────────────────────────────┐
│ Update feeds of subscribed users to reflect the result channels the │
│ users were added to                                                 │
│                                                               450   │
└─────────────────────────────────────────────────────────────────────┘
                                   ↓
┌─────────────────────────────────────────────────────────────────────┐
│ Format each of the result channels                                  │
│                                                               460   │
└─────────────────────────────────────────────────────────────────────┘
```

SPLITTING CONTENT CHANNELS

PRIORITY CLAIM TO RELATED APPLICATION

This application claims the benefit under 35 U.S.C. §119(e) of U.S. Patent Provisional Application No. 61/944,495, filed on Feb. 25, 2014, and Provisional Application No. 61/944,493, filed on Feb. 25, 2014, the entirety of which is incorporation herein by reference.

CROSS-REFERENCE TO RELATED APPLICATION

The present application is related to co-filed U.S. patent application Ser. No. 14/588,152, filed on Dec. 31, 2014, entitled "Merging Content Channels", which is assigned to the assignee of the present application.

TECHNICAL FIELD

This disclosure relates to the field of content sharing platforms and, in particular, to splitting content channels.

BACKGROUND

On the Internet, social networks allow users to connect to and share information with each other. Many social networks include a content sharing aspect that allows users to upload, view, and share content, such as video content, image content, audio content, and so on (which may be collectively referred to as "media items" or "content items"). Such media items may include audio clips, movie clips, TV clips, and music videos, as well as amateur content such as video blogging, short original videos, pictures, photos, other multimedia content, etc. Users may use computing devices (such as smart phones, cellular phones, laptop computers, desktop computers, netbooks, tablet computers) to use, play, and/or consume media items (e.g., watch digital videos, and/or listen to digital music).

The content sharing platform can include one or more channels or one or more channels can be viewable over the Internet. A channel is a mechanism for providing certain media items and/or for providing access to media items to subscribers. Media items for the channel can be selected by a user, uploaded by a user, selected by a content provider, or selected by a broadcaster. Users can subscribe to one or more channels. When the content of a channel is optimized (e.g., focused or specialized) for a coherent audience of users, users of the content sharing platform are more likely to keep watching content items of the channel and/or to subscribe to the channel.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In one implementation, a method for splitting content channels is disclosed. The method includes identifying, by a processing device, result channels originating from a target channel, wherein each of the result channels corresponds to a set of users of the target channel that view a similar set of content items from the target channel. The method may further include, for each of the result channels, subscribing, by the processing device to the result channel, the set of users that corresponds to the result channel, and associating, by the processing device to the result channel, the set of the content items of the target channel that corresponds to the subscribed set of users of the result channel.

In one implementation, the method also includes mapping the users of the target channel to the content items of the target channel that the users have viewed, grouping the users into the sets of users in view of a probability that the users viewed the similar set of the content items, and when each of the grouped sets of users exceeds a threshold level of users, correlating each of the grouped sets of users to a corresponding one of the result channels. The threshold level of users may include at least a number of users or a percentage of users.

In some implementations, the method further includes for each result channel, updating feeds of the corresponding set of users of the result channel to reflect the result channel. In addition, the updating may further include, for each user of the set of users, removing feed items corresponding to the target channel; and replacing the feed items corresponding to the target channel with feed items of the result channel. In addition, the identifying may further include suggesting to an owner of the target channel that the target channel be split into the result channels, and receiving confirmation from the owner to proceed with splitting the target channel into the result channels.

In other implementations, the method includes, for each result channel, automatically generating a user interface (UI) for the result channel utilizing UI elements of the target channel, wherein at least a portion of the UI elements correspond to the set of content items corresponding to the result channel. In addition, the sets of content items corresponding to result channels at least partially overlap. In some implementations, the target channel may include content items of the content sharing platform having at least one of a common topic, theme, or substance. Furthermore, the target channel may include content items of the content sharing platform having a common source.

In additional implementations, computing devices for performing the operations of the above described implementations are also disclosed. Additionally, in implementations of the disclosure, a computer readable storage media stores methods for performing the operations of the above described implementations.

BRIEF DESCRIPTION OF THE DRAWINGS

The present disclosure is illustrated by way of example, and not by way of limitation, in the figures of the accompanying drawings.

DETAILED DESCRIPTION

Implementations are described for splitting content channels. A content sharing platform may include multiple channels. A channel can be an assemblage of data content available from a common source, or data content having a common topic, theme, or substance. Content creators on the content sharing platform may have multiple channels that they publish content to, or they may have one channel that contains all of their published content. Optimizing the content of a channel so that it targets a coherent audience of users results in users that are more likely to keep watching content of the channel and that are more likely to subscribe to the channel. If a channel includes content that crosses multiple genres, it may be less appealing to a viewer because that viewer might like one genre of video on the channel and not another. As a result, the overall value of the channel is diluted for the user.

Implementations of the disclosure enable an existing channel ("target channel") of a content sharing platform to be split into two or more channels. The set of channels ("result channels") that an existing channel may be split into can be based on a distribution of users of the existing channel over the content of the existing channel that the users consume. In some implementations, a UI component of the content sharing platform recommends to the channel owner that the existing channel be split. Once the channel owner approves and/or initiates a split of the existing channel, content items from the existing channel to associate with each result channel, as well as the set of users to subscribe to each result channel, are identified. The result channels are then provided by the content sharing platform and include the identified content items and subscribed users. In some implementations, the feeds of the subscribed users are updated by removing the old feed items from the existing channel and replacing them with the appropriate new feed items from the result channel(s) that the user is subscribed.

Previous implementations of content sharing platforms and/or social networks do not provide a solution for splitting existing channels into multiple resulting channels. As such, these previous implementations of content sharing platforms and/or social networks are not able to provide a solution to optimize channel content for a focused audience of users, and, as such, are limited in the ability to provide solutions for channel owners to increase viewership of channels and increase affinity between users and channels.

Figure 1:
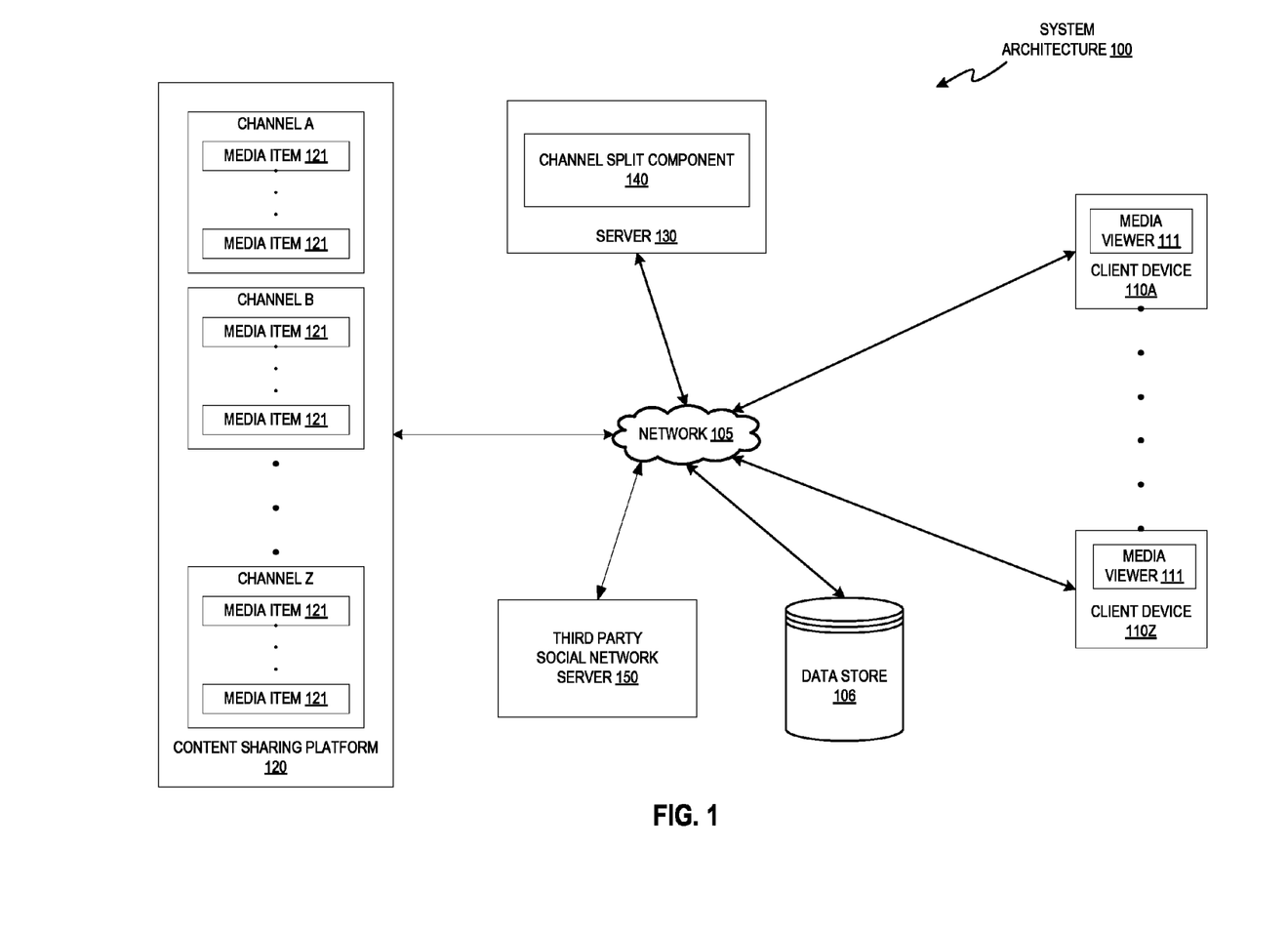
FIG. 1 illustrates an example system architecture, in accordance with one implementation of the disclosure.

FIG. 1 illustrates an example system architecture 100, in accordance with one implementation of the disclosure, for splitting content channels of a content sharing platform. The system architecture 100 includes client devices 110A through 110Z, a network 105, a data store 106, a content sharing platform 120, and a server 130. In one implementation, network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In one implementation, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers).

The client devices 110A through 110Z may each include computing devices such as personal computers (PCs), laptops, mobile phones, smart phones, tablet computers, netbook computers etc. In some implementations, client device 110A through 110Z may also be referred to as "user devices." Each client device includes a media viewer 111. In one implementation, the media viewers 111 may be applications that allow users to view content, such as images, videos, web pages, documents, etc. For example, the media viewer 111 may be a web browser that can access, retrieve, present, and/or navigate content (e.g., web pages such as Hyper Text Markup Language (HTML) pages, digital media items, etc.) served by a web server. The media viewer 111 may render, display, and/or present the content (e.g., a web page, a media viewer) to a user. The media viewer 111 may also display an embedded media player (e.g., a Flash® player or an HTML5 player) that is embedded in a web page (e.g., a web page that may provide information about a product sold by an online merchant). In another example, the media viewer 111 may be a standalone application that allows users to view digital media items (e.g., digital videos, digital images, electronic books, etc.).

The media viewers 111 may be provided to the client devices 110A through 110Z by the server 130 and/or content sharing platform 120. For example, the media viewers 111 may be embedded media players that are embedded in web pages provided by the content sharing platform 120. In another example, the media viewers 111 may be applications that are downloaded from the server 130.

In general, functions described in one implementation as being performed by the content sharing platform 120 can also be performed on the client devices 110A through 110Z in other implementations if appropriate. In addition, the functionality attributed to a particular component can be performed by different or multiple components operating together. The content sharing platform 120 can also be accessed as a service provided to other systems or devices through appropriate application programming interfaces, and thus is not limited to use in websites.

In one implementation, the content sharing platform 120 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to media items and/or provide the media items to the user. For example, the content sharing platform 120 may allow a user to consume, upload, search for, approve of ("like"), dislike, and/or comment on media items. The content sharing platform 120 may also include a website (e.g., a webpage) that may be used to provide a user with access to the media items.

In implementations of the disclosure, a "user" may be represented as a single individual. However, other implementations of the disclosure encompass a "user" being an entity controlled by a set of users and/or an automated source. For example, a set of individual users federated as a community in a social network may be considered a "user".

In another example, a user may be an automated ingestion pipeline, such as a topic channel, of the content sharing platform 120.

The content sharing platform 120 may include multiple channels (e.g., channels A through Z). A channel can be data content available from a common source or data content having a common topic, theme, or substance. The data content can be digital content chosen by a user, digital content made available by a user, digital content uploaded by a user, digital content chosen by a content provider, digital content chosen by a broadcaster, etc. For example, a channel X can include videos Y and Z. A channel can be associated with an owner, who is a user that can perform actions on the channel. Different activities can be associated with the channel based on the owner's actions, such as the owner making digital content available on the channel, the owner selecting (e.g., liking) digital content associated with another channel, the owner commenting on digital content associated with another channel, etc. The activities associated with the channel can be collected into an activity feed for the channel. Users, other than the owner of the channel, can subscribe to one or more channels in which they are interested. The concept of "subscribing" may also be referred to as "liking", "following", "friending", and so on.

Once a user subscribes to a channel, the user can be presented with information from the channel's activity feed. If a user subscribes to multiple channels, the activity feed for each channel to which the user is subscribed can be combined into a syndicated activity feed. Information from the syndicated activity feed can be presented to the user. Channels may have their own feeds. For example, when navigating to a home page of a channel on the content sharing platform, feed items produced by that channel may be shown on the channel home page. Users may have a syndicated feed, which is a feed comprised of at least a subset of the content items from all of the channels to which the user is subscribed. Syndicated feeds may also include content items from channels that the user is not subscribed. For example, the content sharing platform 120 or other social networks may insert recommended content items into the user's syndicated feed, or may insert content items associated with a related connection of the user in the syndicated feed.

Each channel may include one or more media items 121. Examples of a media item 121 can include, and are not limited to, digital video, digital movies, digital photos, digital music, website content, social media updates, electronic books (ebooks), electronic magazines, digital newspapers, digital audio books, electronic journals, web blogs, real simple syndication (RSS) feeds, electronic comic books, software applications, etc. In some implementations, media item 121 is also referred to as a media item.

A media item 121 may be consumed via the Internet and/or via a mobile device application. For brevity and simplicity, an online video (also hereinafter referred to as a video) is used as an example of a media item 121 throughout this document. As used herein, "media," "media item," "online media item," "digital media," "digital media item," "content," and "content item" can include an electronic file that can be executed or loaded using software, firmware or hardware configured to present the digital media item to an entity. In one implementation, the content sharing platform 120 may store the media items 121 using the data store 106.

In one implementation, the server 130 may be one or more computing devices (e.g., a rackmount server, a server computer, etc.). In one implementation, the server 130 may be included in the content sharing platform 120. The server 130 may include a channel split component 140. The channel split component 140 enables an existing channel ("target channel") of the content sharing platform 120 to be split into two or more channels. The set of channels ("result channels") that an existing channel may be split into can be based on a distribution of users of the existing channel over what content of the existing channel that the users consume.

In some implementations, a UI component of the content sharing platform 120 recommends to the channel owner that the target channel be split. Once the channel owner approves and/or initiates a split of the target channel, content items from the target channel to associate with each result channel and the set of users to subscribe to each result channel are identified. The result channels are then launched on the content sharing platform 120 to include the identified content items and subscribed users. In some implementations, the feeds of the subscribed users are updated by removing all of the old feed items from the target channel and replacing them with the appropriate new feed items from the result channel(s) that the user is subscribed.

In some implementations, channel split component 140 of server 130 may interact with content sharing platform 120 and/or with other third party social network servers 150 to provide implementations of the disclosure. Further description of the channel split component 140 and its specific functions is described in more detail below with respect to FIG. 2.

Although implementations of the disclosure are discussed in terms of content sharing platforms and promoting social network sharing of a content item on the content sharing platform, implementations may also be generally applied to any type of social network providing connections between users. Implementations of the disclosure are not limited to content sharing platforms that provide channel subscriptions to users.

In situations in which the systems discussed here collect personal information about users, or may make use of personal information, the users may be provided with an opportunity to control whether the content sharing platform 120 collects user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the content sharing platform 120.

Figure 2:
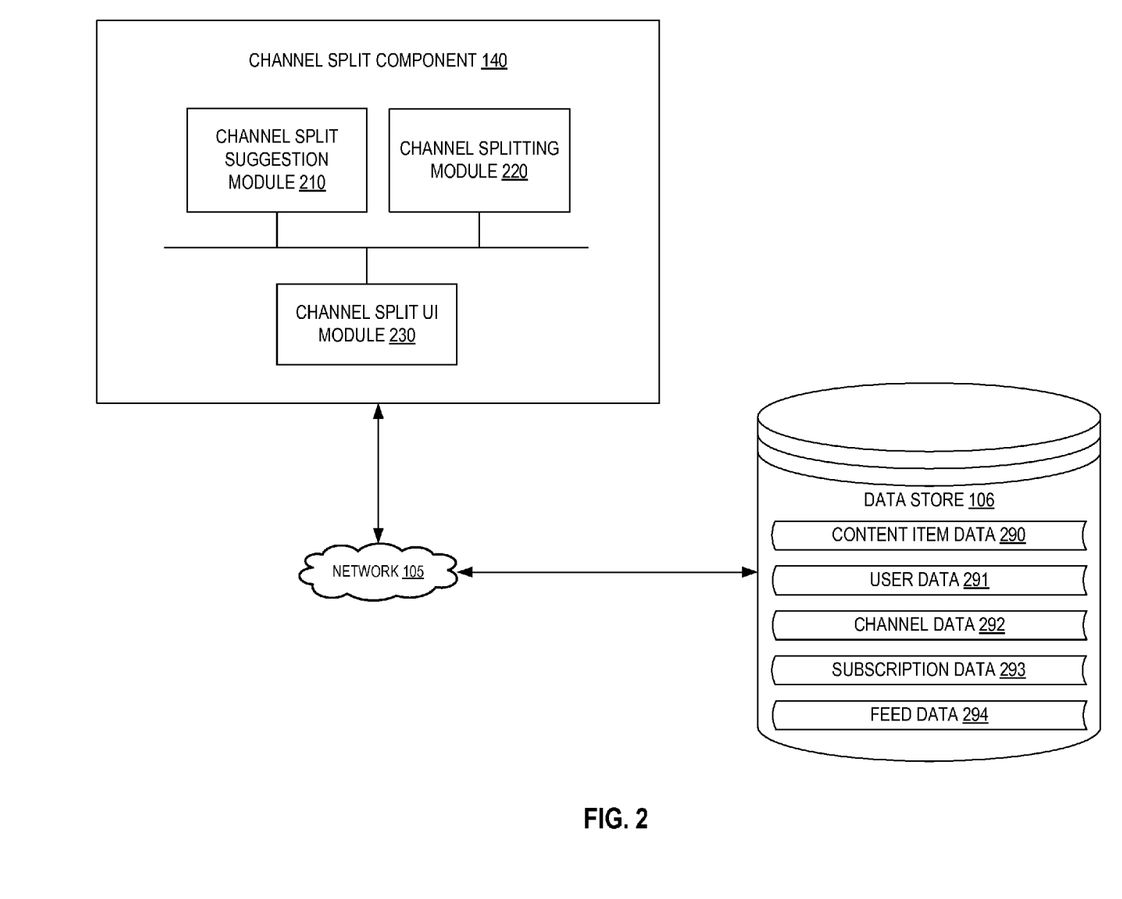
FIG. 2 is a block diagram illustrating a channel split component in accordance with one implementation of the disclosure.

FIG. 2 is a block diagram illustrating a channel split component 140 in accordance with one implementation of the disclosure. In one implementation, the channel split component 140 includes a channel split suggestion module 210, a channel splitting module 220, and a channel split UI generation module 230. More or less components may be included in the channel split component 140 without loss of generality. For example, two of the modules may be combined into a single module, or one of the modules may be divided into two or more modules. In one implementation, one or more of the modules may reside on different computing devices (e.g., different server computers, on a single client device, or distributed among multiple client devices, etc.).

The channel split component 140 is communicatively coupled to the data store 106. For example, the channel split component 140 may be coupled to the data store 106 via a network (e.g., via network 105 as illustrated in FIG. 1). In another example, the channel split component 140 may be coupled directly to a server where the channel split component 140 resides (e.g., may be directly coupled to server 130). The data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers). The data store 106 includes content item data 290, user data 291, channel data 292, subscription data 293, and feed data 294.

As discussed above, the channel split component 140 enables existing target channel of the content sharing platform 120 to be split into two or more result channels. In one implementation, the channel split suggestion module 210 automatically determines when a target channel may split. There may be many reasons that may underlie splitting a channel. In one implementation, splitting a channel may positively enhance an affinity score between the channel and its users. An affinity score may refer to a numerical quantification of a user's relationship with another entity, such as a channel or another user, for example. The more interconnections (e.g., watches, likes, comments, tags, interactions, similar connections, etc.) between the user and the other entity (e.g., channel, other user, etc.), the higher the affinity score.

In one implementation, a user's affinity score for a channel is generated by scoring the engagements (e.g., watches, likes, comments, tags, interactions, etc.) a user has with a channel. Scores for the engagements are then divided by the time since the engagement occurred and the divided scores are then summed together to produce the affinity score between a user and a channel. There may be other factors that are also included in the affinity score calculation as well.

In one example scenario, if half of a channel's associated users (e.g., subscribed or otherwise associated) watch half of the channel's content items, while the other half of the users watch the other half of the channel's content items, then the users of the channel may have a lower affinity score with the channel's content because the users are not engaging with half of the content items of the channel. An increased affinity score may benefit a ranking of the channel in terms of appearance of channel content items in viewer feeds, on a what-to-watch page, on home pages of the users, and so on.

In one implementation, the channel split suggestion module 210 identifies, for a target channel, a set of one or more result channels. In order to identify the one or more result channels, the channel split suggestion module 210 may determine a set of users of the target channel, and then map the users to a set of content items of that target channel that the users have watched. The channel split suggestion module 210 may access logs of the data store 106, such as content item data 290, user data 291, channel data 292, subscription data 293, and feed data 294 to make the target channel split determination. In some implementations, the channel split suggestion module 210 may execute as a "continuous scanner", running an assessment over all new incoming data to the data store 106 and incorporating the new assessment into a standing model maintained by the channel split suggestion module 210.

In one implementation, a clustering analysis may be used to cluster (e.g., group based on similarities) users together based on the users' likelihood of having watched the same or similar sets of content items from that channel. Cluster analysis may refer to the task of grouping a set of objects in such a way that objects in the same group (called a cluster) are more similar (in some sense or another) to each other than to those in other groups (clusters). Various different algorithms may be used to achieve cluster analysis. If, after applying the clustering analysis, a target channel has one dominant cluster, this suggests that most users of the target channel watch the same set of content items on the target channel, and, as such, that target channel is not a good candidate for splitting. However, if a target channel has two or more large viewership clusters, the target channel can be a good candidate for splitting.

In one implementation, a threshold assessment is applied to the resulting clusters of users to determine whether the clusters trigger a splitting suggestion. For example, if a number of users in a cluster exceeds a predetermined number of users and/or if a percentage of users (in terms of the total number of subscribed users to the target channel) exceeds a predetermined percentage of users, then the splitting suggestion may be triggered for the target channel.

When a target channel is determined to be a good candidate for splitting, the channel split suggestion module 210 suggests to the channel owner that the target channel be split. In one implementation, the channel split UI module 230 may recommend to the channel owner that the target channel be split based on the distribution of users over the target channel content that the users consume, as described above. The channel split UI module 230 may provide controls (e.g., UI interface elements) for the channel owner to split the target channel and controls to inform the channel splitting module 220 on how to distribute subscribing users of the target channel among the result channels. When the channel owner indicates, via the controls of the UI provided by the channel split UI module 230, that a target channel is to be split, the channel splitting module 220 handles the creation of the new result channels, and distribution of users and content items among the new result channels.

In some implementations, the target channel split may be performed according to the suggestions provided by the channel split suggestion module 210. In other implementations, the target channel split may be performed according to explicit directives and parameters provided by the channel owner. For example, the channel owner may explicit identify content items of the target channel to associate with the resulting channels.

The channel splitting module 220 may reuse the existing target channel as one of the result channels, or the channel splitting module 220 may create entirely new result channels, and either discard, archive, or maintain the target channel. The channel splitting module 220 may also identify the content items from the target channel to be syndicated to each of the result channels. This might be chosen by the user, automated based on the distribution of users who watch each content item, or based on existing curations of the content items, such as playlists. In some implementations, a content item might be associated with both of the resulting channels.

The channel splitting module 220 may also identify the set of users and/or subscribers to add to each of the result channels. In some implementations, all of the subscribing users from the target channel are added and/or subscribed to each of the result channels. In other implementations, the channel splitting module 220 identifies the subset of users of the target channel to add to each result channel based on the content items that each of the users has consumed (e.g., viewed) and the result channel that such content items are to be distributed.

The channel splitting module 220 may notify the users of the new result channels of the corresponding subscriptions to those results channels. In some implementations, the user is automatically subscribed to the corresponding result channels. The user may be notified on the automatic subscription and provided an opportunity to decline the subscription, as well. In other implementations, authorization from the user is requested for the new subscriptions. In addition, the channel splitting module 220 may provide an opportunity to the users to subscribe to the other result channels to which the users have not been subscribed automatically.

The channel splitting module 220 may then update feeds of the subscribed users by removing the old feed items from the target channel and replacing these feed items with the corresponding new feed items from the result channels that the users are now subscribed. In addition, the channel split UI module 230 may associate formatting and other UI elements with each of the result channels, including, but not limited to, providing a name, profile avatar, banners, and other formatting to each of the result channels. The channel owner may interact with channel split UI module 230 in order to provide input for formatting each result channel.

Figure 3:
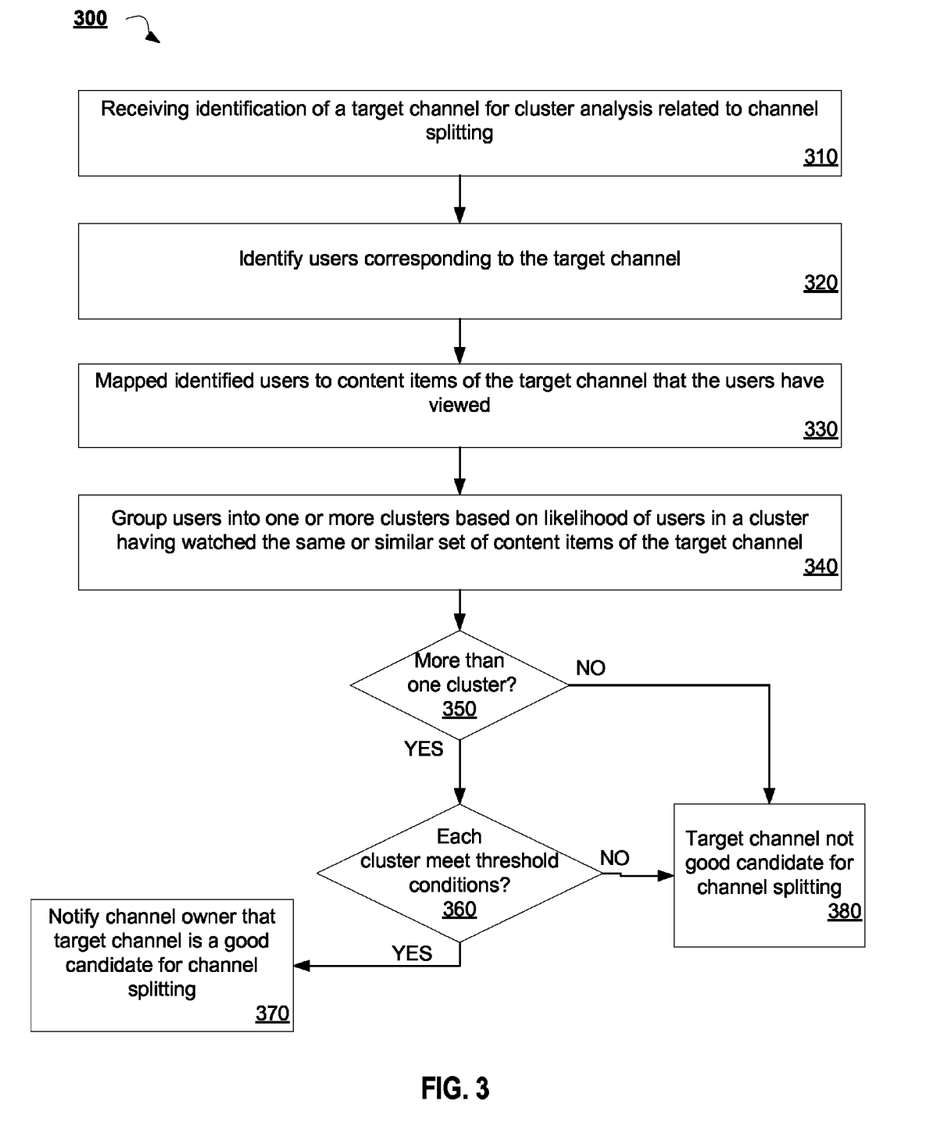
FIG. 3 is a flow diagram illustrating a method for suggesting a split of a target channel according to some implementations of the disclosure.

FIG. 3 is a flow diagram illustrating a method 300 for suggesting a split of a target channel according to some implementations of the disclosure. The method 300 may be performed by processing logic that comprises hardware (e.g., circuitry, dedicated logic, programmable logic, microcode, etc.), software (e.g., instructions run on a processing device to perform hardware simulation), or a combination thereof.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by channel split component 140 as shown in FIGS. 1 and 2.

Referring to FIG. 3, method 300 begins at block 310 when identification is received of a target channel for cluster analysis related to channel splitting. In one implementation, the cluster analysis is performed for target channels on a continuous basis, utilizing a standing model of existing user and channel log data that is updated based on any new log data received for the user and channels of the content sharing platform. At block 320, users that correspond to the target channel are identified. The users may be the subscribed users to the target channel.

Then, at block 330, the identified users are mapped to content items of the cluster corresponding to the users. At block 340, the users are grouped into one or more clusters based on a likelihood of the users in a cluster having watched the same or similar set of content items of the target channel. This grouping utilizes the mapping performed at block 330.

Subsequently, at decision block 350, it is determined whether more than one cluster resulted from the grouping at block 340. If not, method 300 proceeds to block 380 where it is determined that the target channel is not a good candidate for channel splitting. On the other hand, if there is more than one cluster, then method 300 continues to decision block 360, where it is determined whether each of the resulting clusters meets pre-determined threshold conditions for the clusters. For example, the threshold conditions may include a predetermined number of users that the clusters should meet and/or exceed. The threshold conditions may also include a percentage of users (in terms of the total number of subscribed users to the target channel) that the clusters should meet and/or exceed. If the threshold conditions are not met, then method 300 proceeds to block 380, described above.

On the other hand, if the threshold conditions are met by the resulting clusters at decision block 360, then method 300 may continue to block 370. At block 370, the target channel is considered to be a good candidate for channel splitting, and the channel owner is notified with a suggestion to split the target channel.

Figure 4:
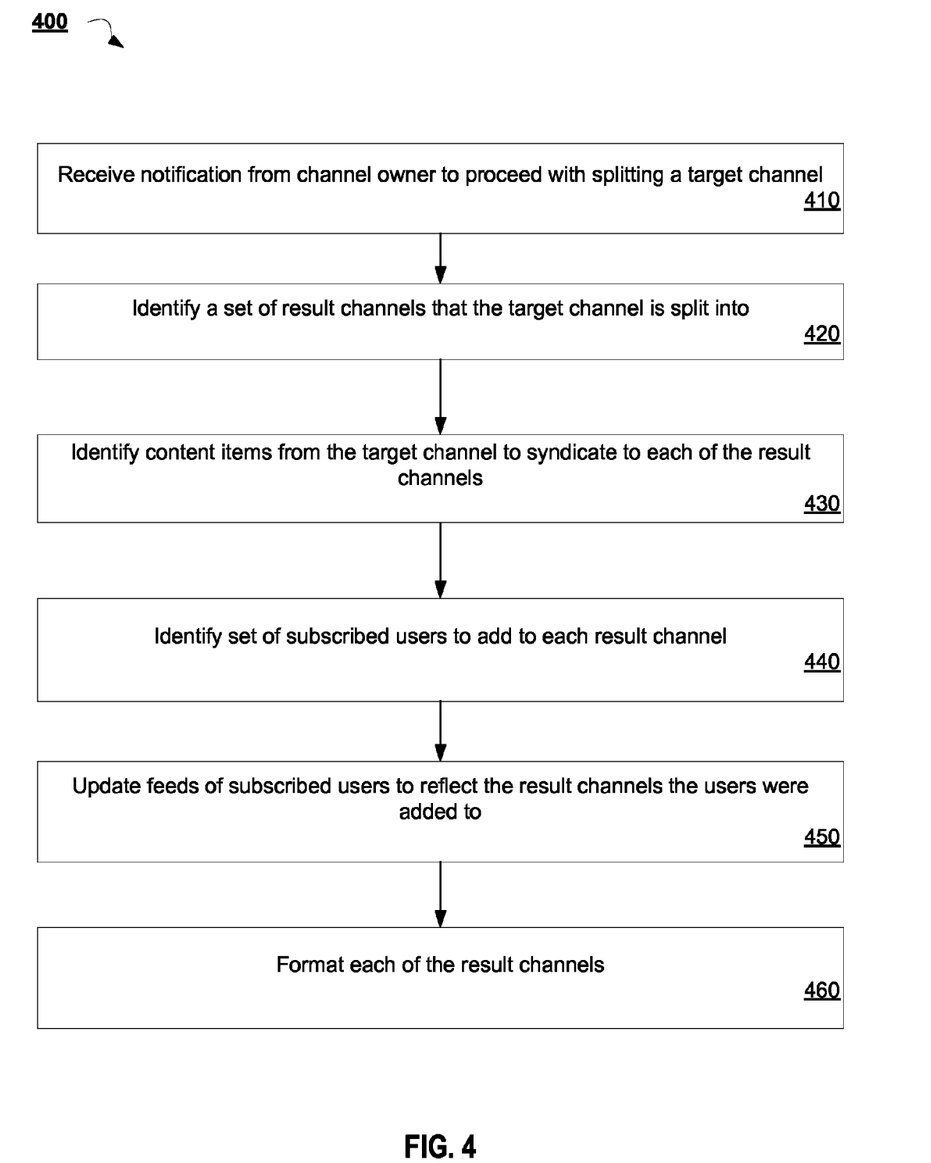
FIG. 4 is a flow diagram illustrating a method for splitting a target channel, according to an implementation of the disclosure.

FIG. 4 is a flow diagram illustrating a method 400 for splitting a target channel, according to an implementation of the disclosure. The method 400 may be performed by processing logic that comprises hardware (e.g., circuitry, dedicated logic, programmable logic, microcode, etc.), software (e.g., instructions run on a processing device to perform hardware simulation), or a combination thereof. In one implementation, method 400 may be performed by channel split component 140 as shown in FIGS. 1 and 2.

Referring to FIG. 4, method 400 begins at block 410 when a notification from a channel owner of a target channel is received. In one implementation, the notification includes instructions from the channel owner to proceed with splitting the target channel per a channel splitting suggestion provided by the content sharing platform, such as the channel splitting suggestion provided by method 300 described with respect to FIG. 3. In other implementations, the channel owner may initiate the channel splitting operation independent from a channel splitting suggestion.

At block 420, a set of result channels are identified. The result channels may correspond to a number of clusters identified by a channel splitting clustering analysis performed with respect to the target channel. For example, the channel splitting cluster analysis described with respect to method 300 of FIG. 3 may produce one or more clusters corresponding to a target channel. These clusters may each represent result channels for the target channel.

At block 430, content items from the target channel are identified to syndicate to each of the result channels. In one implementation, the content items used to cluster the users of the target channel via the clustering analysis are correlated to and syndicated to the result channels. Then, at block 440, a set of subscribed users is identified to add to each result channel. Similar to the content items, the sets of users grouped together according to the cluster analysis of the target channel are correlated and added to the corresponding result channel. In some implementations, the users are also automatically subscribed to their corresponding result channels.

Subsequently, at block 450, feeds of the subscribed users are updated to reflect the result channels that the users were added to. In one implementation, old feed items from the target channel are removed from the user feeds and replaced with corresponding new feed items from the result channels that the users are now subscribed. Lastly, at block 460, each of the result channels are formatted for viewing purposes. For example, UI elements are configured for each of the result channels, where the UI elements may include, but are not limited to, providing a name, profile avatar, banners, and other formatting to each of the result channels. The channel owner may interact with the content sharing platform to provide input for formatting each result channel.

Figure 5:
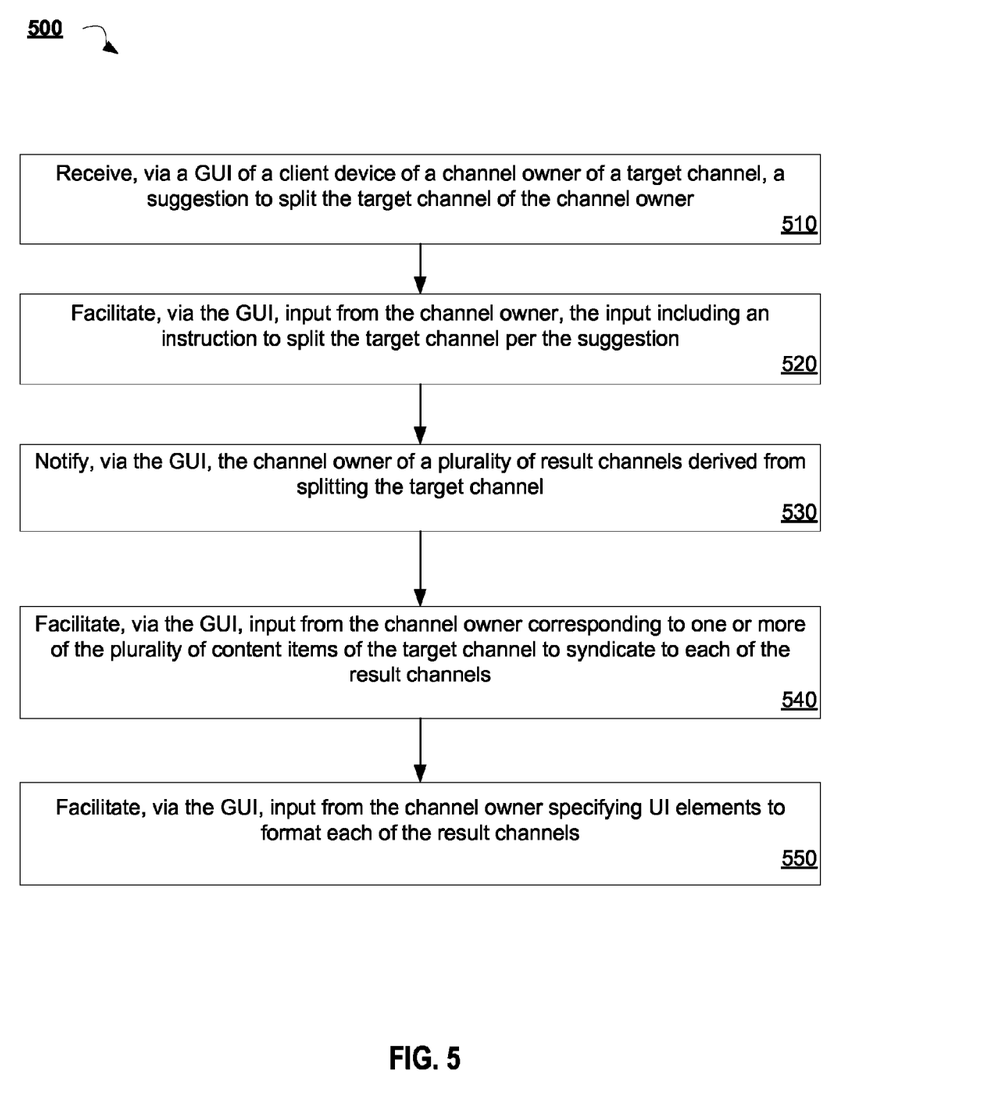
FIG. 5 is a flow diagram illustrating a method for interacting with a channel owner of a target channel at a client device with respect to splitting the target channel, according to an implementation of the disclosure.

FIG. 5 is a flow diagram illustrating a method 500 for interacting with a channel owner of a target channel at a client device with respect to splitting the target channel, according to an implementation of the disclosure. The method 500 may be performed by processing logic that comprises hardware (e.g., circuitry, dedicated logic, programmable logic, microcode, etc.), software (e.g., instructions run on a processing device to perform hardware simulation), or a combination thereof. In one implementation, method 500 may be performed by client device 110A-110Z, as shown in FIGS. 1 and 2.

Referring to FIG. 5, method 500 begins at block 510 when a suggestion to split a target channel is received via a GUI of a client device of a channel owner of the target channel. In one implementation, the client device is a mobile device. The target channel may include a plurality of content items of a content sharing platform. In some implementation, a channel owner may also be referred to as an owning user. At block 520, input from the channel owner of the target channel is facilitated via the GUI. In one implementation, the input includes an instruction to split the target channel per the suggestion.

Subsequently, at block 530, the channel owner is notified, via the GUI, of a plurality of result channels derived from splitting the target channel. In one implementation, each of the plurality of result channels includes a subset of the plurality of content items of the target channel. At block 540, input from the channel owner is facilitated, via the GUI, where the input corresponds to one or more of the plurality of content items of the target channel to syndicate to each of the result channels. Lastly, at block 550, additional input from the channel owner is facilitated, via the GUI, where the additional input specifies UI elements to format each of the result channels.

Figure 6:
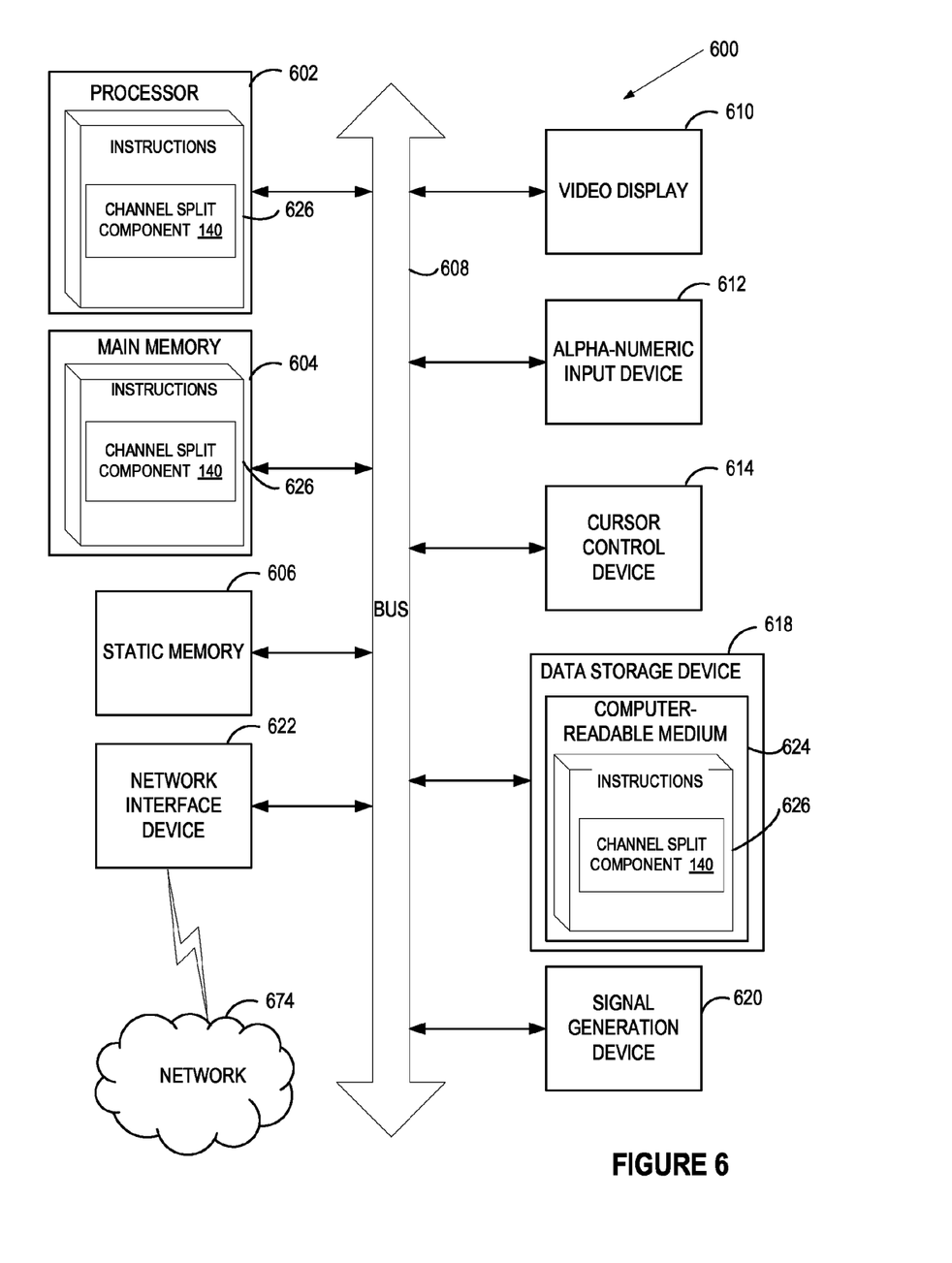
FIG. 6 is a block diagram illustrating an exemplary computer system, according to some implementations.

FIG. 6 illustrates a diagrammatic representation of a machine in the exemplary form of a computer system 600 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device (processor) 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 608.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute instructions 626 for performing the operations and steps discussed herein.

The computer system 600 may further include a network interface device 622. The computer system 600 also may include a video display unit 610 (e.g., a liquid crystal display (LCD), a cathode ray tube (CRT), or a touch screen), an alphanumeric input device 612 (e.g., a keyboard), a cursor control device 614 (e.g., a mouse), and a signal generation device 620 (e.g., a speaker).

The data storage device 618 may include a computer-readable storage medium 624 on which is stored one or more sets of instructions 626 (e.g., software) embodying any one or more of the methodologies or functions described herein. The instructions 626 may also reside, completely or at least partially, within the main memory 604 and/or within the processor 602 during execution thereof by the computer system 600, the main memory 604 and the processor 602 also constituting computer-readable storage media. The instructions 626 may further be transmitted or received over a network 674 via the network interface device 622.

In one implementation, the instructions 626 include instructions for a channel split component 140, which may correspond, respectively, to their identically-named counterparts described with respect to FIGS. 1 and 2, and/or a software library containing methods for splitting channels of content sharing platform. While the computer-readable storage medium 624 is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "segmenting", "analyzing", "determining", "enabling", "identifying," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
    identifying, by a processing device, a plurality of result channels originating from a target channel, wherein a result channel of the plurality of result channels corresponds to a set of users of the target channel that view a similar set of content items from the target channel;
    subscribing, by the processing device to the result channel, the set of users that corresponds to the result channel;
    associating, by the processing device to the result channel, the set of the content items of the target channel that corresponds to the subscribed set of users of the result channel;
    generating, without channel owner interaction, a user interface (UI) for the result channel utilizing formatting and UI elements of the target channel to apply to the result channel; and
    updating activity information provided to each user of the corresponding set of users of the result channel to reflect the result channel, wherein the activity information provided to each user of the corresponding set of users comprises a subset of content items from the result channel and other channels to which a respective user of the corresponding set of users is subscribed, and wherein updating the activity information further comprises updating, in the activity information of each of the users of the result channel, the items corresponding to the target channel to point to the result channel as an originator of the items, wherein the activity information is separate from the result channel.

2. The method of claim 1, wherein the plurality of result channels and the target channel are provided by a content sharing platform.

3. The method of claim 1, wherein the identifying further comprises:
    mapping the users of the target channel to the content items of the target channel that the users have viewed;
    grouping the users into the sets of users in view of a probability that the users viewed the similar set of the content items; and
    when each of the grouped sets of users exceeds a threshold level of users, correlating each of the grouped sets of users to a corresponding one of the plurality of result channels.

4. The method of claim 3, wherein the threshold level of users comprises at least a number of users or a percentage of users.

5. The method of claim 1, wherein the activity information comprises feeds of the corresponding set of users of the result channel.

6. The method of claim 5, wherein the items comprise feed items.

7. The method of claim 1, wherein the identifying further comprising:
suggesting to an owner of the target channel that the target channel be split into the plurality of result channels; and
receiving confirmation from the owner to proceed with splitting the target channel into the plurality of result channels.

8. The method of claim 1, further comprising wherein at least a portion of the UI elements correspond to the set of content items corresponding to the result channel, and wherein the formatting comprises at least one of a name, profile avatar, or banners.

9. The method of claim 1, wherein the sets of content items corresponding to result channels at least partially overlap.

10. The method of claim 1, wherein the target channel comprises content items having at least one of a common topic, theme, or substance.

11. The method of claim 1, wherein the target channel comprises content items having a common source.

12. An apparatus comprising:
a display device;
a memory communicably coupled to the display device; and
a processing device communicably coupled to the memory, the processing device to execute instructions to:
identify a plurality of result channels originating from a target channel, wherein a result channel of the plurality of result channels corresponds to a set of users of the target channel that view a similar set of content items from the target channel;
subscribe, to the result channel, the set of users that corresponds to the result channel;
associate, to the result channel, the set of the content items of the target channel that corresponds to the subscribed set of users of the result channel;
generate, without channel owner interaction, a user interface (UI) for the result channel utilizing formatting and UI elements of the target channel to apply to the result channel; and
update activity information provided to each user of the corresponding set of users of the result channel to reflect the result channel, wherein the activity information provided to each user of the corresponding set of users comprises a subset of content items from the result channel and other channels to which a respective user of the corresponding set of users is subscribed, and wherein updating the activity information further comprises updating, in the activity information of each of the users of the result channel, the items corresponding to the target channel to point to the result channel as an originator of the items, wherein the activity information is separate from the result channel.

13. The apparatus of claim 12, wherein the processing device to identify the result channels further comprises the processing device to:
map the users of the target channel to the content items of the target channel that the users have viewed;
group the users into the sets of users in view of a probability that the users viewed the similar set of the content items; and
when each of the grouped sets of users exceeds a threshold level of users, correlate each of the grouped sets of users to a corresponding one of the plurality of result channels;
wherein the threshold level of users comprises at least a number of users or a percentage of users.

14. The apparatus of claim 12, wherein the processing device to update the activity information further comprises the processing device to update feeds of the corresponding set of users of the result channel to reflect the result channel.

15. The apparatus of claim 12, wherein the processing device to identify the plurality of result channels further comprises the processing device to:
suggest to an owner of the target channel that the target channel be split into the plurality of result channels; and
receive confirmation from the owner to proceed with splitting the target channel into the plurality of result channels.

16. The apparatus of claim 12, wherein at least a portion of the UI elements correspond to the set of content items corresponding to the result channel, and wherein the formatting comprises at least one of a name, profile avatar, or banners.

17. The apparatus of claim 12, wherein the plurality of result channels and the target channel are provided by a content sharing platform, and wherein the target channel comprises content items of the content sharing platform having at least one of a common topic, theme, substance, or source.

18. A non-transitory machine-readable storage medium storing instructions which, when executed, cause a processing device to perform operations comprising:
identifying, by the processing device, a plurality of result channels originating from a target channel, wherein a result channel of the plurality of results channels corresponds to a set of users of the target channel that view a similar set of content items from the target channel;
subscribing, by the processing device to the result channel, the set of users that corresponds to the result channel;
associating, by the processing device to the result channel, the set of the content items of the target channel that corresponds to the subscribed set of users of the result channel;
generating, by the processing device without channel owner interaction, a user interface (UI) for the result channel utilizing formatting and UI elements of the target channel to apply to the result channel; and
updating activity information provided to each user of the corresponding set of users of the result channel to reflect the result channel, wherein the activity information provided to each user of the corresponding set of users comprises a subset of content items from the result channel and other channels to which a respective user of the corresponding set of users is subscribed, and wherein updating the activity information further comprises updating, in the activity information of each of the users of the result channel, the items corresponding to the target channel to point to the result channel as an originator of the items, wherein the activity information is separate from the result channel.

19. The non-transitory machine-readable storage medium of claim 18, wherein the identifying further comprises:
mapping the users of the target channel to the content items of the target channel that the users have viewed;

grouping the users into the sets of users in view of a probability that the users viewed the similar set of the content items; and when each of the grouped sets of users exceeds a threshold level of users, correlating each of the grouped sets of users to a corresponding one of the plurality of result channels;

wherein the threshold level of users comprises at least a number of users or a percentage of users.

20. The non-transitory machine-readable storage medium of claim 18, wherein the identifying further comprising:

suggesting to an owner of the target channel that the target channel be split into the plurality of result channels; and receiving confirmation from the owner to proceed with splitting the target channel into the plurality of result channels.

21. The non-transitory machine-readable storage medium of claim 18, wherein at least a portion of the UI elements correspond to the set of content items corresponding to the result channel, and wherein the formatting comprises at least one of a name, profile avatar, or banners.

22. The non-transitory machine-readable storage medium of claim 18, wherein the plurality of result channels and the target channel are provided by a content sharing platform, and wherein the target channel comprises content items of the content sharing platform having at least one of a common topic, theme, substance, or source.

23. A method comprising:

receiving, via a graphical user interface (GUI) of a mobile device, a suggestion to split a target channel comprising a plurality of content items;

facilitating, via the GUI, input from an owning user of the target channel, the input comprising an instruction to split the target channel per the suggestion; and notifying, via the GUI, the owning user of the target channel of a plurality of result channels derived from splitting the target channel, a result channel of the plurality of result channels comprising a subset of the plurality of content items, wherein activity information provided to each user of a corresponding set of users of the plurality of result channels is updated to reflect the plurality of result channels, and wherein the activity information provided to each user of the corresponding set of users comprises a subset of content items from the corresponding result channel and other channels to which a respective user of the corresponding set of users is subscribed, and wherein updating the activity information further comprises updating, in the activity information of each of the users of the result channel, the items corresponding to the target channel to point to the result channel as an originator of the items, wherein the activity information is separate from the result channel;

wherein user interfaces (UIs) for the plurality of result channels are generated, without owning user interaction, based on formatting and UI elements of the target channel that are applied to the result channel.

24. The method of claim 23, further comprising facilitating, via the GUI, input from the owning user corresponding to one or more content items of the target channel to syndicate to the plurality of result channels.

25. The method of claim 23, further comprising facilitating, via the GUI, input from the owning user, the input specifying the UI elements to format the plurality of result channels, wherein the formatting comprises at least one of a name, profile avatar, or banners.

* * * * *